J. P. YOUNG.
GIN SAW CLEANER.
APPLICATION FILED MAR. 19, 1912.
1,078,399.
Patented Nov. 11, 1913.
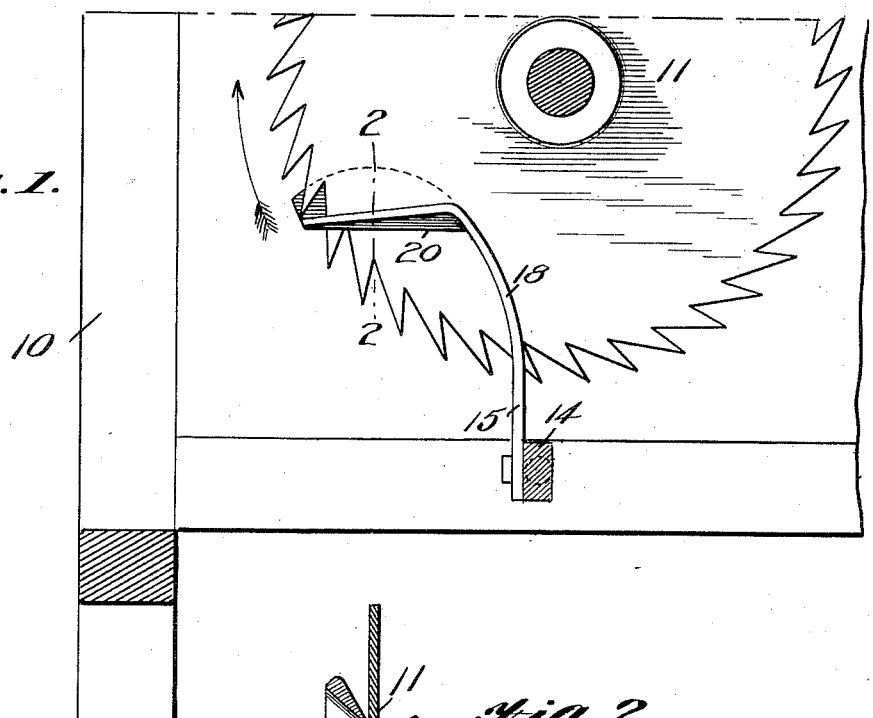
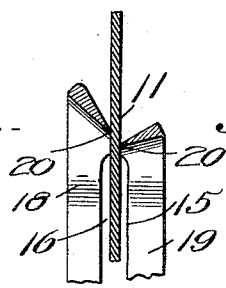
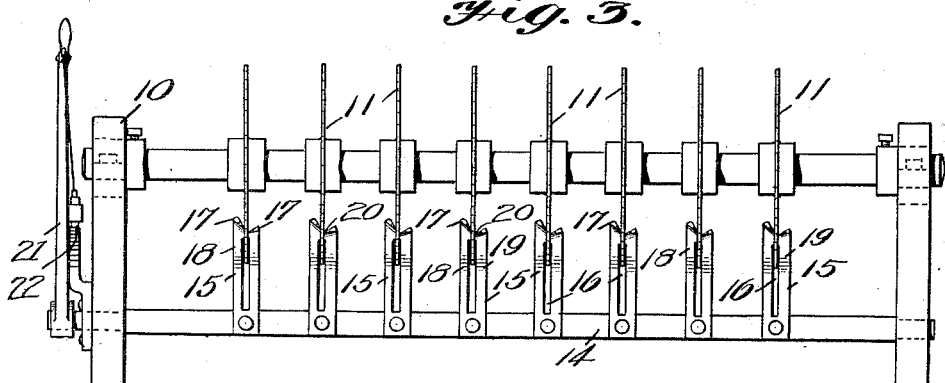
WITNESSES
H. C. Barry
M. A. Schmidt
INVENTOR
James P. Young
BY Eugene H. Stevens
Attorney

UNITED STATES PATENT OFFICE.

JAMES P. YOUNG, OF HACKLEBURG, ALABAMA.

GIN-SAW CLEANER.

1,078,399.  Specification of Letters Patent.  Patented Nov. 11, 1913.

Application filed March 19, 1912. Serial No. 684,673.

*To all whom it may concern:*

Be it known that I, JAMES P. YOUNG, a citizen of the United States, residing at Hackleburg, in the county of Marion and State of Alabama, have invented certain new and useful Improvements in Gin-Saw Cleaners, of which the following is a specification.

This invention relates to devices for cleaning the saws of cotton-gins, and its object is to provide a simple and efficient device which is adapted to be mounted in the frame of the gin and is adjustable into and out of operative position, it being so mounted and arranged that it is entirely out of the way when not in use, so as not to interfere with the proper operation of the gin.

In the accompanying drawing, Figure 1 is a transverse section of a fragment of a gin showing the device in place thereon; Fig. 2 is a vertical section on the line 2—2 of Fig. 1, and Fig. 3 is a front elevation of the cleaning device.

Referring specifically to the drawing, 10 denotes the frame of an ordinary cotton-gin, so much only of the frame being shown as will suffice to make clear the application of the invention. The gang of gin-saws 11 is supported in the frame in any suitable manner. To the frame is pivoted a support for the cleaning devices. The support is a longitudinal bar 14, and the cleaning devices comprise each a shank 15 having a longitudinal slot 16 so that it may straddle the saw, and provided at its extremity with a pair of scraper blades 17. The slot 16 divides the shank into two branches 18 and 19 respectively, at the extremity of which the scraper blades are located. The branches 18 and 19 are slightly curved and at their extremities are made abrupt bends and sidewise twists to form the scraper blades, the scraping or cutting edges 20 of the latter being formed by sharpening the inner edge of the twisted portion of the parts 18 and 19. The sidewise twist also inclines the blades with respect to the surface of the saw whereby a better scraping action is effected.

In operative position, the shank branches 18 and 19 straddle the saw in vertical position, and the blades 17 are positioned so that they extend horizontally, or substantially so, on opposite sides of the saw, and by the sidewise twist of the blades they are made to converge transversely in the direction of their scraping edges 20. The saw is rotated in the direction of the arrow in Fig. 1 so that it runs under with respect to the blades. It will, therefore, be evident that the gum and other foreign matter sticking on the saw will be scraped off and drop down out of the way, and as the blades extend horizontally, there is no danger of the same becoming clogged. One of the blades is set slightly to the rear of the other, which allows a closer contact with the saw. The blades are made of spring steel and are accurately adjusted so as to press lightly against the saw.

In order that the scrapers may be thrown into and out of operative position, there is provided a hand-lever 21 which is connected to one end of the bar 14 and is provided with a suitable locking device 22.

As the space for attaching the herein described device is very small, there being only about five or six inches between the bar 14 and the mote board behind, the device must not only be of such proportions as to come within this space, but it must also not block this space, as it is necessary that the same remain open for the escape of the motes when the gin is in operation. The manner of mounting the device fulfils these requirements, and when not in use the scraper blades are dropped down, thereby leaving open the space herein referred to.

I claim:

1. A gin-saw cleaner comprising a pair of blades extending horizontally on opposite sides of the saw, and one in advance of the other, and inclined transversely and downward toward the saw.

2. A gin-saw cleaner comprising a shank which is slotted to straddle the saw, the two branches of the shank formed by the slot terminating in horizontal blades located respectively on opposite sides of the saw, and inclined transversely and downward toward the same, one of the blades being in advance of the other.

In testimony whereof I affix my signature in presence of two witnesses.

JAMES P. YOUNG.

Witnesses:
WM. A. FROST,
J. H. EVANS.

---

Copies of this patent may be obtained for five cents each, by addressing the "Commissioner of Patents, Washington, D. C."